United States Patent [19]

Druffel

[11] 4,298,465
[45] Nov. 3, 1981

[54] FUEL FILTER AND WATER SEPARATOR APPARATUS

[75] Inventor: James B. Druffel, Modesto, Calif.

[73] Assignee: Racor Industries, Inc., Modesto, Calif.

[21] Appl. No.: 46,384

[22] Filed: Jun. 7, 1979

[51] Int. Cl.³ .............................................. B01D 29/40
[52] U.S. Cl. .................................. 210/304; 210/444; 210/456; 210/512.1
[58] Field of Search .................. 210/94, 304, 312, 306, 210/512, 443, 444, 456, 240, 232, 239, 235, 236; 55/390

[56] References Cited

U.S. PATENT DOCUMENTS

| | | | |
|---|---|---|---|
| 254,364 | 2/1882 | O'Grady | 210/313 |
| 413,021 | 10/1889 | Buhring | 210/249 |
| 1,107,485 | 8/1914 | Bowser | 210/304 |
| 1,175,948 | 3/1916 | French | 210/304 |
| 1,176,732 | 3/1916 | Bowser | 210/304 |
| 1,471,807 | 10/1923 | Roosevelt et al. | 210/313 |
| 1,822,006 | 9/1931 | Bull | 210/304 |
| 2,170,074 | 8/1939 | Hewitt | 210/304 |
| 2,226,045 | 12/1940 | Baldwin | 210/456 |
| 2,514,366 | 7/1950 | Beyland | 210/456 |
| 3,061,105 | 10/1962 | Bradbury et al. | 210/232 |
| 3,061,106 | 10/1962 | Bradbury et al. | 210/232 |
| 3,067,876 | 12/1962 | Hruby, Jr. | 210/304 |
| 3,245,541 | 4/1966 | Silverwater | 210/311 |
| 3,272,336 | 9/1966 | Humbert, Jr. | 210/304 |
| 3,275,144 | 9/1966 | Stripp et al. | 210/232 |
| 3,378,993 | 4/1968 | Veres et al. | 210/512 R |
| 3,390,780 | 7/1968 | Bennet | 210/444 |
| 3,513,979 | 5/1970 | Miller et al. | 210/232 |
| 3,615,018 | 10/1971 | Johnson | 210/232 |
| 3,637,078 | 1/1972 | Hollar | 210/456 |
| 4,136,009 | 1/1979 | Somiron | 210/456 |

Primary Examiner—Theodore A. Granger
Attorney, Agent, or Firm—Flehr, Hohbach, Test, Albritton & Herbert

[57] ABSTRACT

An improved self-contained apparatus for the separation of low density fluids, such as fuel, from higher density fluids such as water and also particles is disclosed which may be easily retrofitted into a variety of existing new and used engines as it can selectively accommodate the various fuel line arrangements and also various obstructions of these engines. Further, the apparatus includes improved flow director means which provides for the separation of the higher density fluid and the particles from the low density fluid at an earlier stage contributing to a more complete separation prior to the filtration of the fluid. Consequently, the filter element has an extended life due to the fact that it is exposed to less higher density fluids and particles in filtering the low density fluids.

2 Claims, 5 Drawing Figures

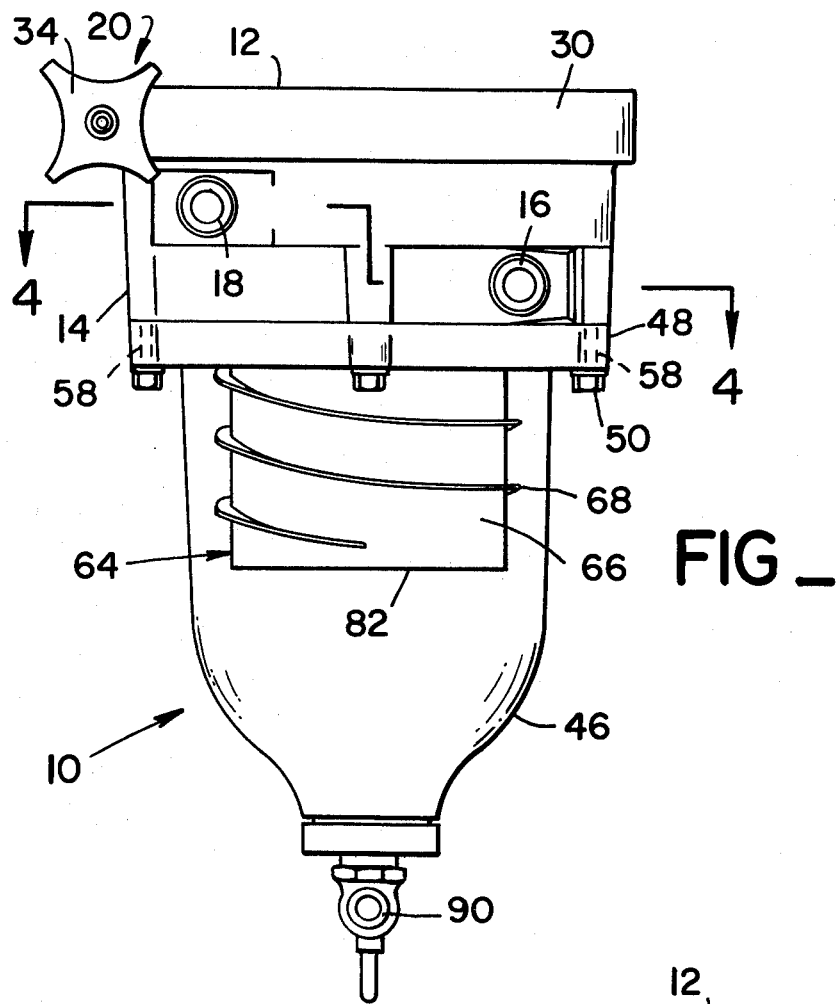
FIG_1
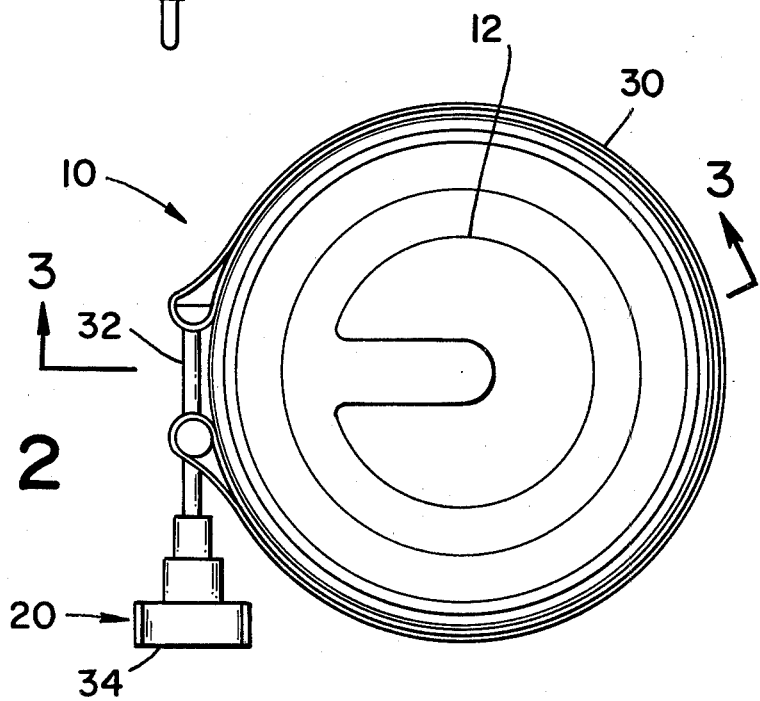
FIG_2

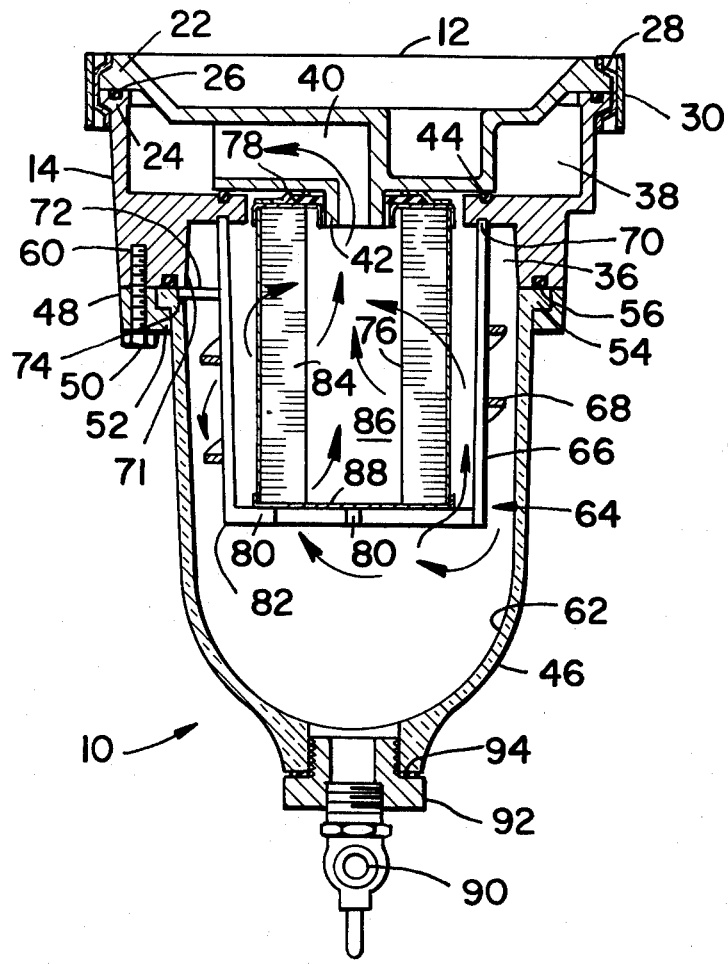
FIG_3
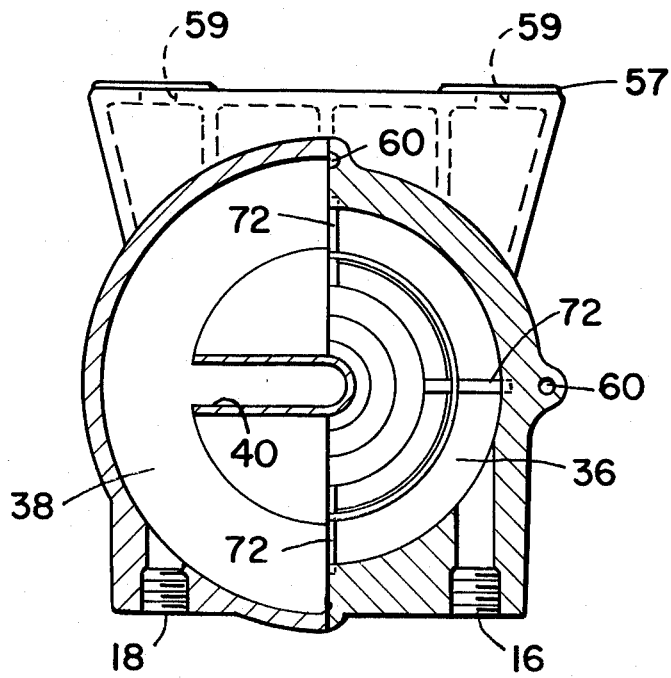
FIG_4

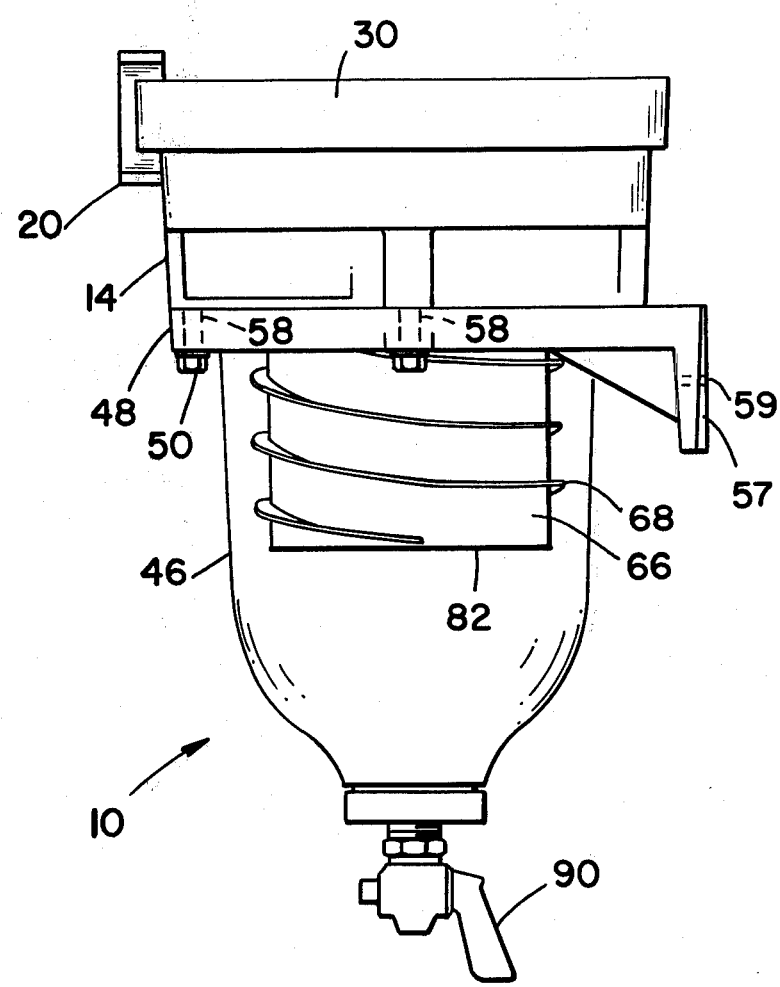
FIG_5

FUEL FILTER AND WATER SEPARATOR APPARATUS

TECHNICAL FIELD

The present invention relates to an apparatus for separating and filtering low density fluid from higher density fluids and particles, and more particularly to a self-contained apparatus which can be retrofitted into existing new and used engines and which provides for early separation of the fluids to ensure long filter element life.

BACKGROUND ART

Self-contained devices for the separation and filtration of low density fluids such as oil, kerosene, diesel fuel, gasoline, and even air, from higher density fluids such as water and particles are known in the prior art. The problems with such systems arise when the separation portion of the apparatus does not provide for adequate separation such that the filter element becomes prematurely clogged with the high density fluid and particles resulting in shortened filter life and inefficient operation. Some prior art devices include spiral channels which spirally direct the fluids contained therein to increase the centrifugal force on the fluids. The centrifugal force tends to separate the particles and higher density fluid from the low density fluids by urging the high density fluid and particles into a spiral orbit that has a greater radius than the spiral orbit of the low density fluids.

However, two problems exist with this type of device. First, the spiral channels are generally quite narrow and thus the gradation of fluids and particles is compressed and the division between the fluids and particles is not as well defined as could be possible if the fluids and particles could be spread across a larger channel.

Further, a second problem is that in these prior art devices, though there is some separation of the fluids and particles as they flow down the spiral channel, the fluids continue to flow together until they exit the end of the channel. At the end of the channel, the centrifugal action throws the particles and higher density fluid into a sump area while the low density fluid flows around the lower edge of the spiral channel and abruptly changes its flow direction by 180 degrees, and moves upwardly into the filter element. Most of the higher density fluid and particles are unable to make this 180 degree turn due to centrifugal force and thus collect in the sump area. Thus, other than at the end of the channel there is no provision for removing the separated particles and higher density fluid from the spiral flow of the low density fluid. Such a provision could prevent any recombination of the fluids and particles so that less higher density fluid and particles would reach the filter element.

Another problem of the prior art devices is that they are designed for installation in a specific location, in a specific engine. Thus, there is no provision for retrofitting a single apparatus into a variety of new and existing engines. Obviously, substantial cost is involved in designing, stocking and manufacturing a variety of filter devices for the multitude of engine applications. Thus, there is a need to provide a separation and filter apparatus that can be retrofitted into a variety of engines, so as to accommodate the various physical space constraints of the engine compartment and also the fluid conduit connection constraints.

Another problem with the prior art devices is that they generally require the use of tools to service and inspect the filter and sump area. Further, the orientation of filter element within the apparatus is not always satisfactory to afford convenient filter removal and replacement.

Also, there is a need to provide an apparatus which allows for visual monitoring of the particles and the higher density fluids.

SUMMARY OF THE INVENTION

The present invention is directed to overcoming one or more of the problems as set forth above.

In an apparatus for separating low density fluid from higher density fluid and particles including a bowl defining an internal fluid separation chamber, a bracket means for mounting said bowl, and means for communicating with said chamber defining a fluid inlet passage having an inlet port and a fluid outlet passage having an outlet port, the improvement comprises means for selectively positioning in a plurality of positions said inlet port and said outlet port relative to said bracket means. Thus, the apparatus can be retrofitted into a variety of existing new and old engines, each of which has its own space restrictions. The bracket means is used to mount the apparatus in a convenient manner. Then the inlet and outlet ports are selectively positioned such that other parts of the engine do not obstruct said ports and such that they can be conveniently connected to a fuel line without having to reroute said fuel line.

Further, the inlet and outlet passages include annular channels which communicate with the inlet and outlet ports and with the separation chamber respectively such that no matter what the orientation of the ports, the annular channels though repositioned about their axes, have the same orientation with respect to the internal fluid separation chamber.

In another aspect of the invention, a sleeve is positioned in the fluid separation chamber which is spaced from the wall of the bowl. The inlet port communicates with the space between the sleeve and the wall of the bowl. A spiral fluid flow director flange is provided on the outer surface of the sleeve. Said spiral fluid flow director flange spirally deflects the incoming fluid so that the particles and higher density fluid seek a spiral orbit which has a larger diameter than the spiral orbit of the low density fluids. Further, as the spiral flow director flange is spaced from the wall of the bowl, the particles and higher density fluid in the larger diameter orbit can gravitate to the sump collection area by flowing between the wall of the bowl and the flow director flange without having to follow the spiral channel defined by the flow director. Consequently, separation and removal of the higher density fluids and particles from the mainstream of the low density fluid occurs earlier and more rapidly than with prior art systems. Thus, there is even less of the higher density fluids and particles that flow with the low density fluid into the filter element region of the apparatus. Consequently, a low density fluid filter element has a longer and more efficient life.

In yet another aspect of the invention, a lid is provided for sealing the bowl. The filter element is removably secured to the lid and the lid is removably secured to the bowl with appropriate quick release means such that the filter can be inspected and replaced conveniently, quickly and without the use of tools. Further, the system can be conveniently primed with the lid removed.

BRIEF DESCRIPTION OF THE DRAWINGS

FIG. 1 is a front elevational view of an embodiment of the fuel filter and water separator of the invention.

FIG. 2 is a top view of the embodiment of FIG. 1.

FIG. 3 is a front cross-sectional view taken through line 3—3 in FIG. 2.

FIG. 4 is a top cross-sectional view taken through line 4—4 in FIG. 1.

FIG. 5 is a side elevational view of the embodiment of FIG. 1.

DETAILED DESCRIPTION OF THE PREFERRED EMBODIMENT

Referring to the figures and in particular to FIGS. 1-3, the fuel filter and water separator apparatus of the invention is denoted by the numeral 10. Apparatus 10 includes a lid 12, a base 14, which defines inlet port 16 and outlet port 18 and a quick release retainer clamp 20, which secures the lid 12 to the base 14. Lid 12 is generally circular and includes an annular flange 22. Base 14 is generally cylindrical and includes an annular flange 24 which defines an annular channel for receiving sealing ring 26. The annular flange 22 of the lid is positionable in contact with annular flange 24 so as to compress sealing ring 26 therebetween and form a fluid seal (FIG. 3). Retainer clamp 20 includes an inner ring 28 which is generally U-shaped in cross section and which mates with the annular flanges 22 and 24. An outer ring 30, and thus inner ring 28 are drawn together by a screw 32 (FIG. 2) which can be actuated by plastic knob 34, to positionably lock lid 12 to base 14.

Base 14 defines annular inlet passage 36 which communicates with inlet port 16 and annular outlet passage 38 which communicates with outlet port 18. As can be seen in FIGS. 3 and 4, inlet passage 36 is located below outlet passage 18 and has a diameter slightly less than said outlet passage 38. Further, as can be seen in FIGS. 3 and 4, an L-shaped passage 40 communicates with annular outlet passage 38 through a provided aperture in said passage and ends in a downwardly directed nipple. An additional lower lid gasket 44 provides a seal between the lower portion of lid 12 adjacent L-shaped passage 40 and base 14. Except as otherwise indicated, the components of apparatus 10 may be comprised of metal.

A clear bowl 46 which in a preferred embodiment can be comprised of a plastic material is secured to base 14 by a bowl ring bracket 48 and bolts 50. Bowl ring bracket 48 includes annular internal flange 52 which mates with an annular external flange 54 of bowl 46, to hold said bowl in a sealing arrangement with a sealing ring 56 which is retained in base 14. Bowl ring bracket 48 includes four apertures 58 which are alignable with apertures 60 (FIG. 4) of base 14 to receive said bolts 50. Apertures 58 and 60 are evenly placed along circles with equal diameters. Thus, base 14 can be rotated in 90 degree increments with respect to bowl ring bracket 48 and secured thereto with bolts 50.

It is to be understood that additional apertures such as aperture 58 and 60 can be provided in bowl ring bracket 48 and base 14 so that base 14 can be selectively positioned with respect to bowl ring bracket 48 in increments of less than 90 degrees. Thus, it can be seen that the inlet and outlet ports 16 and 18 can be selectively positioned with respect to bowl ring bracket 48 in any increments selected. It is to be further understood that the bowl ring bracket 48 and the bowl 46 could be integrally formed of metal or an appropriate plastic.

Bowl ring bracket 48 includes a flange 57 provided with appropriate apertures 59 for receiving bolts (not shown) to hold bowl ring bracket 48 to an appropriate location in, for example, an engine compartment.

Disposed in an internal fluid separation chamber 62 defined by bowl 46 is a plastic or metal flow director 64. Flow director 64 includes a cylindrical sleeve 66 and a spiraling flow director flange 68 which is disposed on the external surface of said sleeve 66. Also extending from the external surface of sleeve 66 adjacent its upper end 70 are four tabs 72 which rest in an annular groove 74 defined by bowl 46 and located internally to annular flange 54. Further, upper end 70 of cylindrical sleeve 66 is received in an annular groove defined by base 14. A filter cartridge 76 is received inside cylindrical sleeve 66 and spaced therefrom. Filter cartridge 76 includes a cap and gasket 78 which is force-fit over nipple 42 of lid 12. Further, filter cartridge 76 rests on tabs 80 which project inwardly from the lower end 82 of cylindrical sleeve 66. Filter cartridge 76 includes in a preferred embodiment a pleated, resin impregnated celulose media element 84 which defines a central chamber 86, the upper end of which communicates with L-shaped passage 40 through nipple 42. The lower end of filter cartridge 76 and the lower end of central chamber 86 is blocked with a cover 88. Consequently, fluids can only flow radially inward through media element 84.

The inner wall of annular passage 36 is defined by the upper portion of sleeve 66 adjacent upper end 70. The annular passage 36 defines a lower annular aperture 71 which communicates with the internal fluid separation chamber 62 of bowl 46.

The lower end of the bowl 46 is provided with a petcock or drain valve 90 for selectively emptying the bowl 46. In the embodiment shown, petcock 90 is mounted to a bowl plug 92 which is adapted to mount to the bowl 46. A bowl plug gasket 94 provides a seal between bowl 46 and bowl plug gasket 94.

The operation of the above invention is as follows. First, a location is selected in an engine compartment such as a diesel engine compartment, where a portion of the fuel line which connects the fuel tank to the engine can be accessed. Aperture 58 and 60 and bolts 50 are used to orient base 14 with respect to the bowl ring bracket 48 so that inlet and outlet ports 16 and 18 are not obstructed by any other parts of the engine and so that they can be conveniently connected to the fuel line. Then the bowl ring bracket 48 is secured to the engine compartment by appropriate bolt means provided through apertures 59. The fuel line is severed and the inlet port 16 is connected to the part of the fuel line which communicates with the fuel tank and the outlet port 18 is connected to the portion of the fuel line which communicates with the engine. The fluid, which can include fuel contaminated with water and particles, is tangentially introduced into the internal fluid separation chamber 62 by inlet port 16 and annular inlet passage 36.

Separation of the fluids begin as the fluid and particles flow spirally downwardly as directed by spiraling flow director flange 68 between sleeve 66 and bowl 46. As the fluids and particles spiral downwardly, centrifugal force causes the higher density fluid, such as water, and the particles to seek an orbit which has a larger diameter than the low density fluid such as the fuel. Thus, a gradation is established. As the flow director flange 68 does not touch the wall of bowl 46, the higher density fluid and particles which are located adjacent bowl 46 can begin to settle directly downwardly under the influence of gravity.

Additionally, separation of the low density fuel from the higher density water and particles is encouraged when the higher density water and particles under the influence of gravity and centrifugal force are unable to make a 180 degree turn along with the low density fuel, which flows up into the lower end of sleeve 66. The particles and high density water are collected at the lower end of bowl 46 and can be selectively drained therefrom by a petcock 90. Immediately under the cover 88 of filter cartridge 76 a coalescing area is defined wherein remaining fluid droplets of the higher density fluid combined with other larger droplets of the higher density fluid and flow downwardly towards petcock 90. The low density fluid which is drawn upwardly in the space defined between internal surface of sleeve 66 and filter cartridge 76 contains only extremely fine droplets of the high density fluid and fine particles. The fuel is filtered through filter element 84 and flows into central chamber 86. The higher density fluid and the particles are trapped in the media element 84. From central chamber 86 the fluid flows through the L-shaped passage 40 and the annular outlet passage 38, and through outlet port 18 to the engine. A further discussion of the physical science mechanisms involved in separation, coalescing and filtration stages can be found in U.S. Pat. No. 3,931,011, issued Jan. 6, 1976 to Mark S. Richards and Shannon B. Copeland, which is incorporated herein by reference.

Thus, it can be seen that the present invention is superior to the prior art in that the base 14 can be selectively positioned with respect to the bowl ring bracket 48, so that the apparatus 10 can be retrofitted into new and existing engine compartments with the inlet and outlet ports conveniently connected to the fuel line. Further, as the spiral fluid flow director flange 68 is spaced from the wall of bowl 62, fluid separation can be more complete in that the higher density fluid is separated from the low density fluid by centrifugal force and also by gravity as they spiral downwardly as directed by flow director flange 68.

Other aspects, objects and advantages of this invention can be obtained from a study of the drawings, the disclosure and the appended claims.

What is claimed is:

1. A fuel filter apparatus for filtering and separating low density fluid from higher density fluid and particles, which filter apparatus is operable in a variety of engines, comprising:

a bowl defining an internal fluid separation chamber;
a bracket means for mounting said bowl to the engine;
base means separate from said bracket means for defining a fluid inlet passage having an inlet port adapted to be communicable with the engine fuel line and for defining a fluid outlet passage having an outlet port adapted to be communicable with the engine fuel line, said inlet and outlet passages provided in fluid communication with said internal fluid separation chamber;
said base means including a filter element, a removable lid and clamp means for securing the removable lid to the remainder of said base means and wherein said fluid outlet passage defines a nipple means for removably mounting said filter element, which nipple means is integral with said removable lid to allow removal and inspection of said filter element with the removal of said removable lid and wherein said filter element extends into said internal fluid separation chamber;
a sleeve positioned about said filter element in said internal fluid separation chamber and spaced from said bowl, and wherein said inlet port communicates with the space between said sleeve and said bowl;
a spiral fluid flow director flange secured to the outer surface of said sleeve and extending substantially continuously, axially along said sleeve, said flow director flange for spirally directing the fluids in the space between the sleeve and the bowl so that the particles and higher density fluids seek a spiral orbit with a larger diameter than the spiral orbit of the low density fluid; and
wherein said spiral fluid flow director flange is spaced from said bowl so that particles and higher density fluids in the larger diameter orbit can flow downwardly past said spiral fluid flow director flange in the space between said bowl and said spiral fluid flow director flange;
means for selectively positioning in a plurality of positions said inlet port and said outlet port relative to said bracket means including:
a first plurality of apertures provided through said bracket means which first plurality of apertures are located in a circle having a predetermined radius;
another plurality of apertures provided through said base means, which another plurality of apertures are located on another circle having said predetermined radius and are selectively alignable with said first plurality of apertures; and
means disposable through said first plurality of apertures and said another plurality of apertures, with said first plurality of apertures and said another plurality of apertures aligned, for securing said bracket means to said base means with said base means positioned in any one of a plurality of orientations with respect to said bracket means to allow selective positioning of said inlet and outlet ports relative to said bracket means.

2. A fuel filter apparatus for filtering and separating low density fluid from higher density fluid and particles, which filter apparatus is operable in a variety of engines, comprising:

a bowl defining an internal fluid separation chamber;
a bracket means for mounting said bowl to the engine;
base means separate from said bracket means for defining a fluid inlet passage having an inlet port adapted to be communicable with the engine fuel line and for defining a fluid outlet passage having an outlet port adapted to be communicable with the engine fuel line, said inlet and outlet passage provided in fluid communication with said internal fluid separation chamber, said base means being separately rotatable with respect to said bracket means;
means for selectively securing in a plurality of positions said inlet port and said outlet port relative to said bracket means; and
said base means including a filter element, a removable lid and clamp means for securing the removable lid to the remainder of said base means, and wherein said fluid outlet passage defines a nipple means for removably mounting said filter element, which nipple means is integral with said removable lid to allow removal and inspection of the filter element with the removal of said removable lid.

* * * * *